United States Patent [19]
Stauffer

[11] 3,846,629
[45] Nov. 5, 1974

[54] SENSITIVITY BALANCING APPARATUS FOR PHOTO RESPONSIVE DETECTING CIRCUITS

[75] Inventor: Norman L. Stauffer, Englewood, Calif.

[73] Assignee: Honeywell Inc., Minneapolis, Minn.

[22] Filed: Dec. 6, 1973

[21] Appl. No.: 422,168

[52] U.S. Cl............... 431/22, 250/204, 250/209, 250/216, 250/234, 354/25, 356/125
[51] Int. Cl............................................. G01j 1/20
[58] Field of Search ........... 250/216, 201, 204, 578, 250/234, 235, 236, 233, 208, 209; 356/125, 126; 354/125, 195; 353/101

[56] References Cited
UNITED STATES PATENTS

| | | | |
|---|---|---|---|
| 3,450,883 | 6/1969 | Thomas | 250/204 |
| 3,493,764 | 2/1970 | Craig | 313/101 X |
| 3,610,934 | 10/1971 | Turner | 250/201 |
| 3,708,619 | 1/1973 | Martin | 353/101 X |
| 3,723,003 | 3/1973 | Vockenhober et al. | 250/201 X |
| 3,792,268 | 2/1974 | Bjerke et al. | 250/216 X |

*Primary Examiner*—Walter Stolwein
*Attorney, Agent, or Firm*—Arthur H. Swanson; Burton, Lockwood D.

[57] ABSTRACT

A focus detecting system includes first and second lens devices for forming first and second auxiliary images of an object on first and second detector devices, respectively. Each detector device includes a corresponding plurality of linearly displaced light responsive elements. Before initiating a focus detecting function, a light diffusing device is positioned in the light paths ahead of the detector devices to effect substantially equal illumination of the detector devices. A balancing circuit connected to the detector devices or the a balancing charge representative of any inequality in the signals fuel to the corresponding light responsive elements. When the focus detecting action is initiated, the light diffusing device is removed and one of the lens devices moves with respect to its associated detector device to shift the light distribution pattern of the corresponding auxiliary image. The moving lens device is so coupled to a moving objective lens, which focusses a principal image of the object on a light sensitive film, that when the principal image is in focus, equal amounts of light will fall on corresponding light responsive elements of the first and second detector devices. The stored balancing charge is combined with the signals provided by the photo responsive elements during a focus detecting operation to provide compensated signals which are then processed to effect the termination of the movement of the objective lens when the principal image is properly focussed.

10 Claims, 5 Drawing Figures

3,846,629

SENSITIVITY BALANCING APPARATUS FOR PHOTO RESPONSIVE DETECTING CIRCUITS

CROSS REFERENCE TO RELATED APPLICATIONS

Subject matter disclosed but not claimed herein is disclosed and claimed in a copending application of G. L Towne, Ser. No. 422,167, filed on even date herewith, and copending application of N. L. Stauffer, ser. No. 377,809 filed on July 9, 1973.

BACKGROUND OF THE INVENTION

The present invention relates generally to automatic focussing systems, and in particular to a balancing circuit which may be used to balance photo responsive elements in an automatic focussing system, such as may be found, for example, in United States Patent Office Class 250, sub class 204.

In prior art light sensing systems wherein the signals provided by two or more light sensors were to be compared in some manner to provide a control signal for controlling the system, a heretofore unavoidable shortcoming of prior art devices has been the inability to inexpensively provide a sensing apparatus which will effectively exhibit substantially identical response characteristics between two light sensors, both initially, and over a period of time. For example, in a system where the signals from two or more sensors are to be compared, it is relatively expensive to provide two or more sensors with substantially identical response characteristics when any substantial degree of precision is required. Further, when each sensor is exposed to the light to be sensed through a lens or other light passage device, the effective sensitivity of the two sensors will become mis-matched if one of the lenses should become less transmissive than the other from, for example, dirt or a finger print. Still further, even if two sensors are provided with substantially identical characteristics initially, those characteristics may change with time and those changes will not necessarily take place at the same rate. For example, if initially two sensors exhibit an output of one unit of voltaGe or resistance per unit of light falling thereon, after a period of time, one sensor may yield more or less than one unit of voltage or resistance per unit of light while the responsiveness of the other sensor may remain relatively unchanged.

SUMMARY OF THE INVENTION

It is, accordingly, an object of the present invention to provide a light sensing apparatus which overcomes the shortcomings of prior art devices.

It is another object of the present invention to provide an improved automatic focus system for cameras.

It is a further object of the present invention to provide an improved automatic focus system as set forth which includes a unique balancing circuit for effectively matching the response characteristics of two or more light sensors.

It is still another object of the present invention to provide an improved automatic focus system as set forth which is simple in design and operation and which is relatively inexpensive to manufacture.

In accomplishing these and other objects, there has been provided, in accordance with the present invention, an improved automatic focussing system wherein means are provided for producing a pair of auxiliary images which, in turn, impinge on a pair of multi-element detector devices. The detector devices are so arranged that distributions of the light patterns of the two images are sensed and compared. Further means are provided which respond to difference signals provided by the comparison of the two images to produce a focus signal. Means are also provided which, during a balancing period prior to a focussing period, are operable to equally illuminate the detecting devices. Any difference signals generated during the balancing period are stored and combined with the difference signals generated during a subsequent focussing period to electrically compensate the focus signal for any mismatch in effective sensitivity between the detecting devices. The focus signal, in turn, is used to adjust the position of one of the images with respect to its corresponding detector device. The movement of the image is coordinated with a focussing means which concurrently varies the focus of a principal image such that an identity of the light distributions relative to the associated detecting devices coincides with an optimum focus of the principal image.

BRIEF DESCRIPTION OF THE DRAWINGS

A better understanding of the present invention may be had from the following detailed description when read in connection with the accompanying drawings, in which.

DESCRIPTION OF THE PREFERRED EMBODIMENTS

Figure 1:
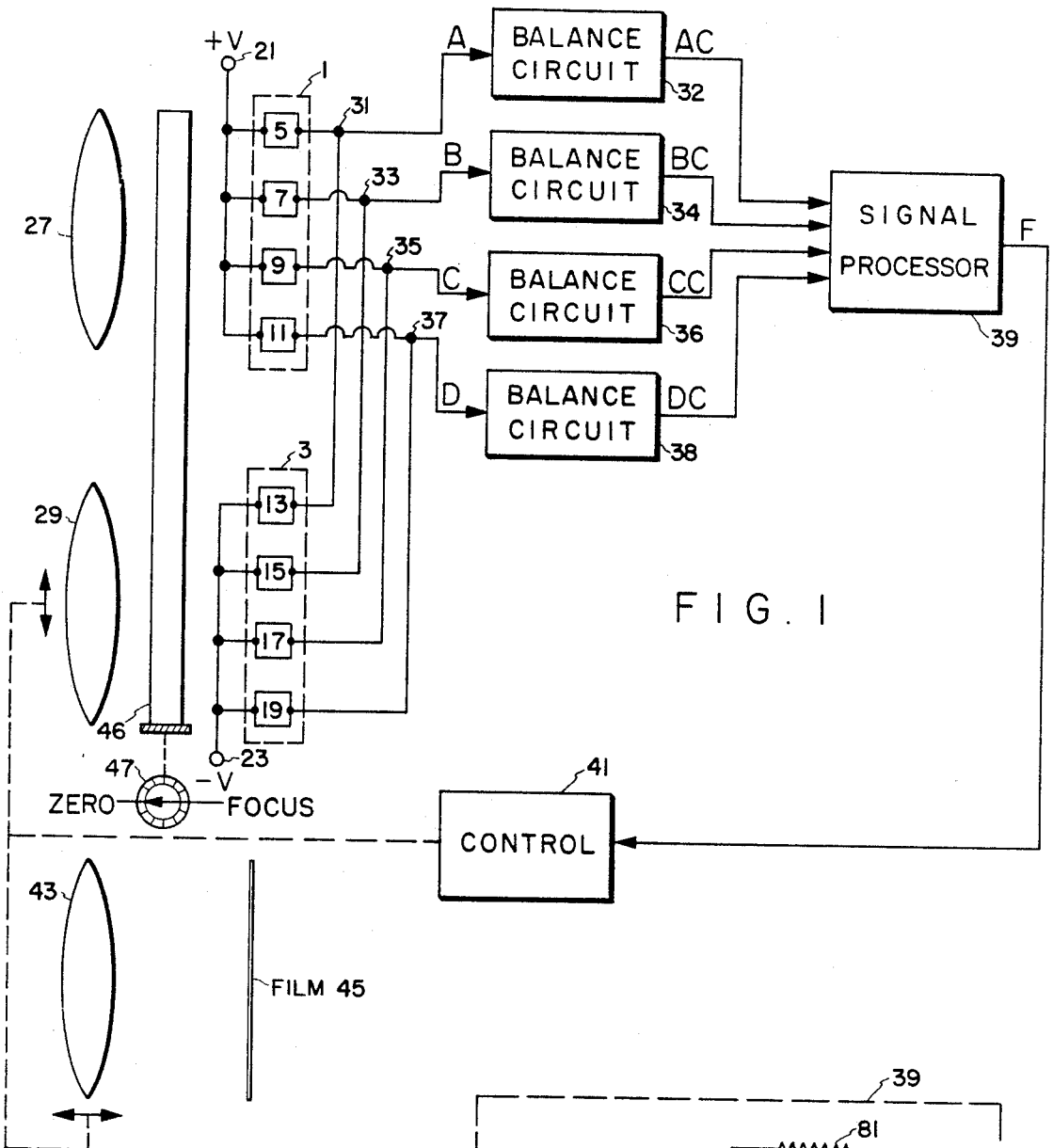
FIG. 1 is a schematic diagram of an automatic focussing apparatus utilizing the present invention.

Referring to the drawings in more detail, FIG. 1 shows a first detecting device 1 and a second detecting device 3. Each of the detecting devices is made up of a linear array of a plurality of individual light responsive elements. In the present example, the first detecting device 1 includes four light responsive elements, 5, 7, 9 and 11. The second detecting device 3 also includes four light responsive elements 13, 15, 17 and 19. The light responsive elements in the exemplary embodiments of FIG. 1 are photo resistive elements. The elements in the first detecting device 1 have a common terminal 21 connected to a first potential +V. Photo resistive elements of the second detecting device 3 also have a common terminal 23 which is connected to a second potential −V. Although but four light responsive elements are shown in each detecting device in the illustrative example, it will be appreciated that any number of elements may be used. The more elements that are used in each of the detecting devices, the greater will be the definition and reliability of the results obtained therefrom. A first lens 27 and a second lens 29 represent means for forming a first and second image of a relatively distant object. The two detecting devices 1 and 3 are shown as being positioned in coplanar relationship with respect to each other. Although the schematic representation in FIG. 1 shows the faces of the light detecting devices 1 and 3, it is understood that the faces, which include the light responsive elements of the first and second detecting devices 1 and 3, are, in actual construction, facing the first and second lenses 27 and 29 to receive the radiation passing therethrough. A first auxiliary image is therefore formed on the face of the first detecting device 1 from the radiation passing through the first lens 27, and a second auxiliary image is formed on the face of the second detecting device 3 from the radiation passing through the second lens 29. It is not essential that the first and second auxiliary images be precisely focussed at the plane of the detecting devices; it is only necessary that the light distribution patterns of the two auxiliary images can be matched with regard to the respective detecting devices. In that connection, the two auxiliary images may be significantly out of focus at the plane of the detecting devices so long as each light pattern formed on the plane of the detecting devices exhibits a distinguishable spatial radiation distribution.

As illustrated, both lenses 27 and 29 are arranged to form auxiliary images of the same portion of the remote object or scene. It will be appreciated that both of the optical means including the lenses 27 and 29 are arranged to respond to a relatively small angle of view, or example on the order of one to ten degrees. The auxiliary image formed by the first lens 27 will be centered with respect to the detecting device 1, the first lens 27 and detecting device being positionally fixed and coordinated with respect to a reference point in an associated view finder, (not shown). That image will produce a signal at each of the light sensitive elements in the first detecting device 1, each signal having a magnitude which is a function of the light level of that portion of the image which impinges on the individual elements. As the second lens 29 is moved in a direction parallel to that of the linear displacement of light responsive elements in the second detecting device 3, the light distribution pattern falling on the second detecting device 3, which is substantially the same as the light distribution pattern formed on the first detecting device 1 through the first lens 27, will be shifted in the direction of the linear displacement of the individual light responsive elements in the second detecting device 3. Each light responsive element 5, 7, 9 and 11 of the first detecting device 1 has a corresponding light responsive element 13, 15, 17 and 19, respectively, in the second detecting device 3. The correspondence is based on the relative position of each light responsive element with respect to the particular array or detecting device of which it forms a part. As hereinbefore mentioned, each light responsive element in the first and second light detecting devices 1 and 3, has a common terminal connected to first and second potentials, respectively. The other terminals of corresponding ones of the light responsive elements 5 and 13, 7 and 15, 9 and 17, and 11 and 19, are connected together at common points 31, 33, 35 and 37, respectively, to provide difference signals A, B, C, and D, for application to corresponding balancing circuits 32, 34, 36 and 38, respectively. The balancing circuits 32, 34, 36 and 38 provide compensated difference signals AC, BC, CC, and DC, respectively, for application to a signal processor circuit, 39.

The signal processor circuit 39 provides a composite output signal F which is applied to a control circuit 41. The control circuit is arranged to control the hereinbefore described movement of the second lens 29 and also the focussing movement of an objective lens means 43. The objective lens means 43 is arranged to focus a principal image of the object on a light sensitive film 45, for example. To distinguish the image formed on the light sensitive film 45 from the first and second images formed on the first and second detecting devices 1 and 3, the image formed on the light sensitive film 45 is referred to as the principal image while the first and second images formed on the first and second detecting devices 1 and 3 are referred to as the first and second auxiliary images, respectively.

A light diffuser 46 and a selection means 47 together comprise a selectively operable means for selectively diffusing the light passing through the first and second lenses 27 and 29 thereby allowing substantially equal amounts of radiation to fall on all of the light responsive elements in the first and second detecting devices 1 and 3. The selection means 47 is selectively operable between a "zero" position and a "focus" position. When an index mark on the selection means is aligned with the "zero" marking, the light diffuser 46 is in a position in the light paths ahead of the first and second detecting devices 1 and 3. While in that position, the balancing circuits 32, 34, 36 and 38 are operable to store a balancing signal, thereby zeroing the photo-responsive elements of the first and second detecting devices 1 and 3 as is hereinbefore explained. When the selection means 47 is in the "focus" position, the light diffusing means 46 is moved away from its previous position in the light path of the photo-responsive elements of the first and second detecting devices 1 and 3. The photo-responsive elements of the first and second detecting devices 1 and 3 will receive distinguishable light distribution patterns as determined by the object and the relative position of the first and second lenses 27 and 29 with respect to the first and second detecting devices 1 and 3.

Figure 2:
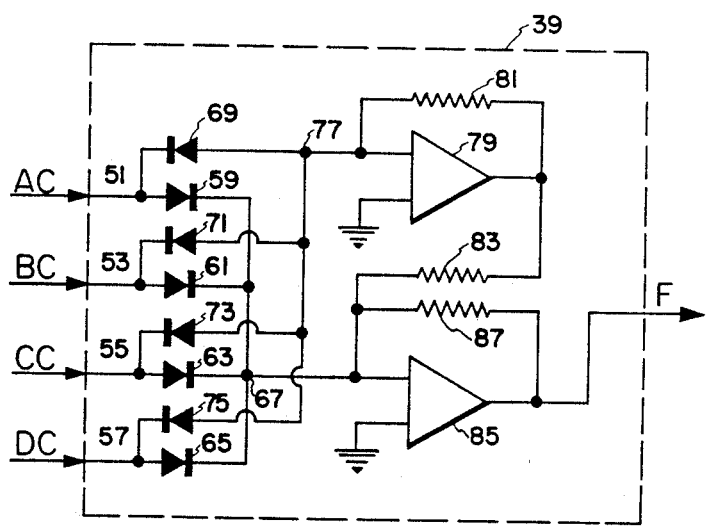
FIG. 2 is a schematic diagram of the signal processing circuit shown in FIG. 1.

The signal processing circuit 39 is shown in detail in FIG. 2 as substantially comprised of a rectifier and summer circuit. The compensated difference signals AC, BC, CC, and DC are received by associated input leads 51, 53, 55 and 57. Each of the input leads 51, 53, 55 and 57 is connected through the anode to cathode path of an associated diode 59, 61, 63 and 65 to a first point 67. The input leads 51, 53, 55 and 57 of the signal processor 39 are also connected through the cathode to anode path of another set of associated diodes 69, 71, 73, 75, respectively, to a second point 77. The second point 77 is connected to a first input terminal of an inverting amplifier 79. A second input to the amplifier 79 is connected to a common reference or ground. A feedback resistor 81 is connected between the output terminal of the amplifier 79 and its first input terminal. The output terminal of the amplifier 79 is connected through a resistor 83 to a first input terminal of an output amplifier 85. The first input terminal of the amplifier 85 is also connected to the first point 67. The amplifier 85 has a second input terminal connected to the common reference. A feedback resistor 87 connects the output terminal of the amplifier 85 with its first input terminal. The output terminal of the amplifier 85 provides the composite output signal F from the signal processor 39.

Figure 3:
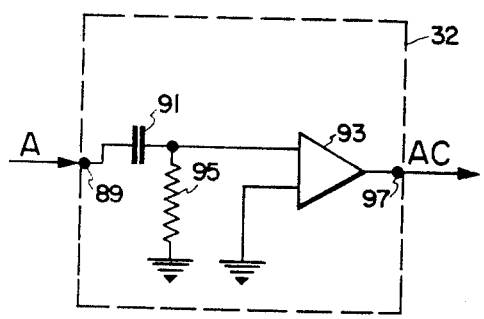
FIG. 3 is a schematic diagram of one arrangement of a balancing circuit which may be used with the circuit of FIG. 1 and which embodies the present invention.

In FIG. 3, there is shown one arrangement of the balance circuit 32. In FIG. 3, a balance circuit input terminal 89 is arranged to receive a difference signal, for example A, from a common terminal, for example 31. The input terminal 89 of the balance circuit 32 is connected to one terminal of a capacitor 91, the other terminal of which is connected to a first input terminal of an amplifier 93. The first input terminal of the amplifier 93 is also connected through a resistor 95 to the common reference potential or ground. The amplifier 93 also has a second input terminal connected to the common reference potential or ground, and an output terminal connected to an output terminal 97 of the balance circuit. The balance circuit output terminal 97 provides a compensated difference signal, AC, for application to the signal processor 39.

In operation, a photographer aims the camera, including the automatic focussing system shown in FIG. 1, toward an object to be photographed. Before a focussing operation is initiated, the photographer will "zero" the first and second detecting devices 1 and 3. That is accomplished when the photographer moves the indicator on the selection means 47 to the "zero" position which will cause the light diffusing means 46 to move into a position in the light paths ahead of the first and second detecting devices 1 and 3. When the diffusing means 46 is in the position between the first and second auxiliary lenses 27 and 29 and the first and second detecting devices 1 and 3, the light diffusing means 46 will effect the substantially equal illumination of all of the light responsive elements of the first and second detecting devices 1 and 3. Since corresponding photo resistive elements are connected between positive and negative potentials of the same magnitude, the common points 31, 33, 35 and 37 between corresponding photo resistive elements will exhibit a zero potential, i.e. halfway between +V and −V, when corresponding photo resistors are equally illuminated. That will not be the case, however, if the light responsive characteristics of corresponding photo resistors are or have become mis-matched due to the passage of time or due to an unbalance in light transmission between the first and second auxiliary lenses. The latter condition may occur for example, when one of the auxiliary lenses has accumulated more dust than the other. If therefore, for any reason, corresponding photo resistive elements do not exhibit identical resistance when the diffusing means is in its "zero" position, the potential appearing at the common terminals 31, 33, 35 and 37 will not be zero, but rather will exhibit a potential representative of a mis-match between corresponding photo resistive elements. For example, if the photo resistive element 5 exhibits less sensitivity than its corresponding photo resistive element 13, and assuming that the same amount of radiation falls on the photo resistor 5 as falls on the photo resistor 13, the resistance of the photo resistor 5 will be greater than the photo resistor 13 and a negative potential will appear at the common terminal 31. That negative potential will effect the charging of the capacitor 91 (FIG. 3) of the balancing circuit 32. When the capacitor 91 becomes charged to a level representative of that negative potential, that charge will remain stored by the capacitor 91 until the light diffusing means 46 is moved away from its "zero" position, ahead of the light detecting devices 1 and 3, and differing amounts of radiation fall on those photo resistors 5 and 13. At that time the charge on the capacitor 91 will dissipate in accordance with the new potential appearing at the common terminal 31. However, the focussing operation is designed to be completed before the charge on the capacitor 91 has been substantially changed.

After the light diffusing means 46 has been in position long enough to store the difference signals generated at the common terminals during the "zeroing" operation, the photographer will move the indicator on the selection means 47 to the "focus" position. That switching action from the "zero" function to the "focus" function may be accomplished manually, as shown, or automatically by means well known in the art. For example, a timing circuit may be provided which will effect the automatic switching to the focus function after a predetermined time period calculated to provide sufficient time for the charge of the capacitor 91. As hereinbefore noted, when the automatic focussing system shown in FIG. 1 is in the focussing portion of the operational cycle, the light diffusing means 46 is removed from the position shown in FIG. 1 and radiation passing through the first and second auxiliary lenses 27 and 29 will fall directly on the photo resistive elements of the first and second detecting devices 1 and 3 without passing through the light diffusing means 46. The object to be photographed will form a light distribution pattern on the first detecting device 1 from radiation passing through the first auxiliary lens 27. That radiation pattern as sensed by the photo resistors 5, 7, 9 and 11 forms a standard, or reference, since the first auxiliary lens 27 does not move in the embodiment of FIG. 1. The light distribution pattern formed on the second detecting device 3, as the second auxiliary lens 29 is moved up and down, is continuously compared with the standard, or reference, distribution pattern as detected by the first detecting device 1. When the light distribution pattern falling on the first detecting device 1 is identically positioned with respect to the first detecting device 1 as the light distribution pattern falling on the second detecting device 3 with respect to the second detecting device 3, each pair of corresponding photo responsive elements 5 and 13, 7 and 15, 9 and 17, and 11 and 19, will be equally illuminated and the common terminals 31, 33, 35 and 37 will exhibit a zero potential, assuming that the response characteristics of the corresponding photo responsive elements are matched. That condition is sensed by the remainder of the automatic focussing circuit of FIG. 1 to provide the signal indicative of the fact that the principal lens 43 is in its proper focus position. It should be noted, that the distance between the first and second auxiliary lenses 27 and 29 is directly related to the distance from the auxiliary lenses to the object to be photographed. For example, if the object to be photographed is relatively close to the first and second auxiliary lenses, the second auxiliary lens 29 must be relatively close to the first auxiliary lens 27 in order for the light distribution pattern formed on the second detecting device 3 to be in an identical position with respect to the second detecting device 3 as the light distribution pattern formed on the first detecting device 1 is with respect to the first detecting device 1. As the object to be photographed moves further away from the first and second auxiliary lenses 27 and 29, the second auxiliary lens 29 must accordingly move away from the first auxiliary lens 27 in order to position the light distribution pattern formed on the second detecting device in relatively the same position with respect to the photo responsive elements therein as the distribution pattern formed on the first detecting device 1 with respect to the individual photo responsive elements included therein. Thus, the relative position of the second auxiliary lens 29 is indicative of the distance between the object to be photographed and the automatic focus camera. The movement of the second auxiliary lens 29 is coordinated with the movement of the principal lens 43. The auto focus system shown in FIG. 1 is so designed that when the relative position of the light distribution pattern on the second detecting device 3 is the same as that on the first detecting device 1, corresponding photo responsive elements will be equally illuminated and when the absolute values of the difference signals appearing at the common terminals 31, 33, 35 and 37 all sum to a minimum value, the composite focus signal F will exhibit a minimum value. That minimum value is detected by the control circuit 41 to terminate the movement of the second auxiliary lens 29 and the principal lens 43. At that time the principal lens 43 is in a position to properly focus the object to be photographed on the light sensitive film 45.

The balancing circuits 32, 34, 36 and 38 are so designed to compensate the difference signals A, B, C and D for any mismatch in sensitivity between corresponding photo responsive elements of the first and second detector devices. For example, without the diffusing means 46 and the balancing circuits 32, 34, 36 and 38, if the sensitivity of corresponding light responsive elements 5 and 13, for example, had become mismatched for any reason, an erroneous difference signal would be generated at the common terminal 31 which may effect the generation of a signal indicative that the image on the light sensitive film is properly focussed when, in fact, that would not be the case. If for example, the photo resistor 13 had become less responsive than the photo resistor 5, when the photo resistor 5 and the photo resistor 13 are equally illuminated, a positive potential would appear at the common terminal 31 since the resistance of the photo resistor 5 would be less than that of the photo resistor 13. Therefore instead of a zero potential difference signal A appearing at the common terminal 31 when the corresponding photo resistive element 5 and 13 are equally illuminated, a positive potential would appear. That erroneous signal would have the effect of causing principal lens 43 to continue its movement even after it has reached the proper focus position. On the other hand, still assuming that the photo resistor 13 has become less responsive than its corresponding photo resistor 5, in a situation where a greater amount of radiation falls on the photo resistor 13 than its corresponding photo resistor 5, a zero potential may appear at the common terminal 31 which would normally be indicative of the fact that the principal lens 43 is in the proper focus position. That situation would occur since the radiation falling on the photo resistor 5 would cause the photo resistor 5 to assume a first resistance. A greater amount of radiation would fall on the photo resistor 13, but since the photo resistor 13 is for some reason less responsive, its effective resistance may be substantially the same as that of the photo resistor 5 and a zero potential signal would appear at the common terminal 31. Therefore even though a greater amount of radiation falls on the photo resistor 13 than falls on the photo resistor 5, the difference signal A may indicate equal radiation upon the corresponding photo resistor 5 and 13 which in turn would be indicative of the fact that the principal lens 43 is in the proper focus position. Therefore, mismatched photo resistors may cause the principal lens 43 to stop at a position which is not the position at which the image formed on the light sensitive film is properly focussed. The balance circuits 32, 34, 36 and 38 operate in conjunction with the light diffusing means 46 to provide equal radiation of corresponding photo resistive elements before a focussing operation takes place to sense the difference signals which may be generated due to a mismatch in sensitivity between corresponding photo resistors. The difference signals generated during the "zeroing" phase are stored and combined with difference signals generated during a subsequent "focussing" phase to compensate for any mismatch in sensitivity between corresponding photo responsive elements of the first and second detecting devices. The exemplary system is so designed that the second auxiliary lens 29 moves between its extreme positions before the charge stored by the capacitor 91 discharges to ground. Therefore when the principal lens 43 is in its proper focus position, the secured auxiliary lens 29 will be in a position to cause the light distribution pattern appearing at the second detecting device 3 to be identically positioned with respect to the latter as the light distribution pattern formed on the first detecting device 1 is positioned with respect to the latter. Accordingly, equal radiation will fall on the light responsive device 5 as falls on the light responsive device 13. Assuming that the photo resistor 13 has become less responsive than the photo resistor 5 due to the passage of time, when the same radiation falls on the photo resistor 5 as falls on the photo resistor 13 the effective resistance of the photo resistor 5 will be less than the resistance of the photo resistor 13 and a positive potential will appear at the common terminal 31. The capacitor 91 will then charge to such a value that no offset voltage is received at the input of the amplifier 93. The time constant of the RC network comprising the capacitor 91 and the resistor 95 is such that the focus action will be completed before the capacitor 91 has had a significant change of charge. For example, the time constant of the RC portions of the balancing circuits may be on the order of one second while the focus action would take place in the order of one hundred milliseconds. Thus, a balancing signal indicative of any mismatch is effective sensitivity between corresponding light responsive elements is stored by the capacitor 91 and later combined with a difference signal generated during a focussing action to compensate those difference signals for the apparent mismatch and provide compensated difference signals AC, BC, CC and DC for application to the signal processor circuit 39. Therefore, if, during a "zeroing" period, a positive potential appears at the common terminal 31, the compensated difference signal AC will be at a zero potential indicative of the fact that the principal lens is in the proper focus position when the difference signal generated during a focus action is the same value as the difference signal appearing during a zeroing action.

The signal processor circuit 39 as shown in detail in FIG. 2 is comprised of a rectifier and summer. Negative value compensated difference signals are summed at the point 77 and inverted by the amplifier 79 while all of the positive value compensated difference signals are summed at the point 67. the rectified negative value compensated difference signals are added to the summed positive value difference signals and applied to the first input terminal of the amplifier 85 which in turn provides the composite focus signal F. The focus signal F will be at a minimum value therefor when the signals from one detecting device exhibit a minimum deviation from the signals provided by corresponding photo responsive elements in the other detecting device. That condition indicates that the light distribution patterns on each detecting device are identically positioned with respect to the associated detecting device and that the principal lens 43 is in the proper focus position. The focus signal F is applied to a control circuit 41 which is, in turn, operable to terminate the movement of the second auxiliary lens 29 and the principal lens 43. The photographer may then take a picture which will be properly focussed.

Figure 4:
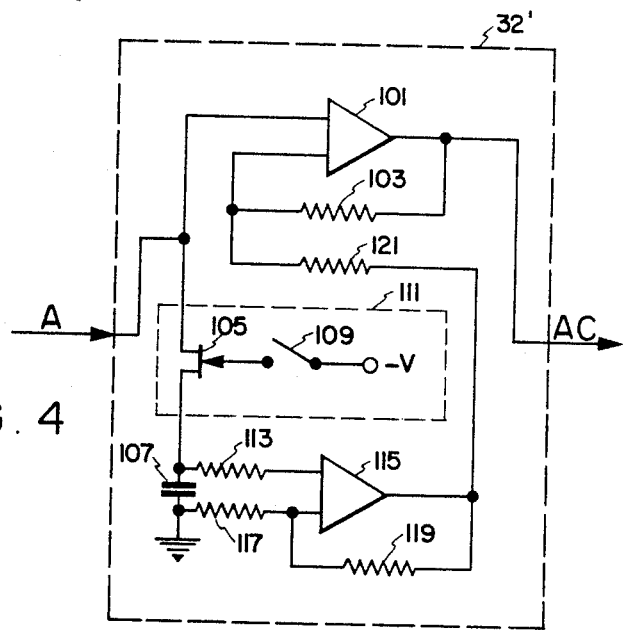
FIG. 4 is a schematic diagram of another arrangement of a balancing circuit which may be used with the circuit of FIG. 1 which also embodies the present invention.

The balance circuit 32' shown in FIG. 4 provides an additional advantage in that there is no reliance on completing the focus action before a storage means can discharge. The input lead receiving the difference signal A is connected to a first input terminal of an amplifier 101. The amplifier 101 has a feedback resistor 103 connected between its output terminal and a second input terminal thereof. The first input terminal of the amplifier 101 is connected through a field effect transistor (FET) 105 to one terminal of a capacitor 107. The other terminal of the capacitor 107 is connected to the common reference or ground. The control electrode of the FET 105 is connected through a switch 109 to a source of negative potential $-V$. The FET 105 and the switch 109 together comprise a switching device 111. A point between the capacitor 107 and the FET 105 is connected through a resistor 113 to a first input terminal of amplifier 115. The other side of the capacitor 107 is connected through a resistor 117 to a second input terminal of the amplifier 115. The output terminal of the amplifier 115 has a feedback resistor 119 connected to the second input terminal thereof. The output terminal of the amplifier 115 is also connected through a resistor 121 to the second input terminal of the amplifier 101. The output terminal of the amplifier 101 provides the compensated difference signal at the output of the balance circuit 32'.

In operation, during a "zeroing" or balancing action when the diffusing means 46 is in a position in the light paths ahead of the first and second detecting devices 1 and 3, the switch 109 is open as shown allowing the FET 105 to conduct, thereby charging the capacitor 107 to the mismatch voltage represented by the difference signal A. For convenience, switch 109 may be so coupled to the selection means 47 that when the selection means 47 is in the "zero" position, the switch 109 is open and vice versa. When the FET 105 is conducting, it presents a low impedance path and the capacitor 107 is rapidly charged to the mismatch voltage. Thereafter, when the selection means 46 is switched to the "focus" position and the diffusing means 47 is moved out of the light paths between the first and second auxiliary lenses and the first and second detecting devices, the switch 109 is closed thereby effectively turning off the FET 105. When the FET 105 is not conducting, a high impedance path is presented thereby and the capacitor 107 is substantially precluded from discharging. The mismatch voltage stored by the capacitor 107 is amplified by the amplifier 115 and applied to the amplifier 101 to act as a standard to be compared to subsequent difference signals generated during the "focus" action. Thereafter when the difference signal A is of a potential substantially equal to the mismatch voltage stored when corresponding light responsive elements were equally illuminated, the output of the amplifier 101 is at a minimum value, i.e. closest to zero potential. The compensated difference signal AC provided by the balance circuit 32' is then applied to the signal processor circuit 39 and processed as hereinbefore explained. With the balance circuit 32', the storage means or capacitor 107 has no path by which it may readily discharge and therefore is effective to hold the balance signal representative of the mismatch voltage over a longer period of time than the balance circuit shown in FIG. 3.

Figure 5:
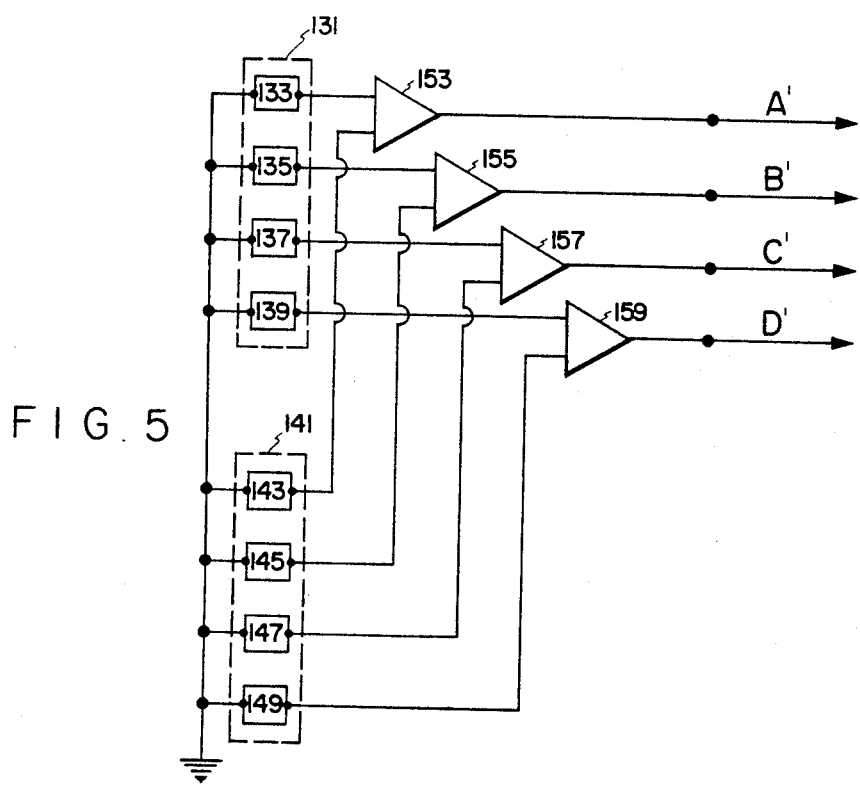
FIG. 5 is a schematic diagram illustrating another arrangement for the light detecting devices of FIG. 1.

FIG. 5 shows an arrangement of the first and second detecting devices wherein photovoltaic elements are used instead of the photoresistive elements as presented in FIG. 1. A first detecting device 131 includes photovoltaic elements 133, 135, 137, and 139 and a second detecting device 141 includes corresponding photovoltaic elements 143, 145, 147 and 149, respectively. One terminal of each of the photovoltaic elements is connected to a common reference, or ground. The other terminals of corresponding first photovoltaic elements 133 and 143 of the first and second detecting devices 131 and 141, respectively, are connected to the input terminals of a first differential amplifier 153. Similarly, the other terminals of the second, third and fourth corresponding pairs of photovoltaic elements 135 and 145, 137 and 147, and 139 and 149, are connected to the input terminals of corresponding differential amplifiers 155, 157, and 159, respectively. Each differential amplifier provides a difference signal A', B', C' and D', respectively, at the output terminals thereof, for application to the balance circuit as shown in FIG. 1. In the arrangement of FIG. 5 each photovoltaic element provides a voltage representative of the intensity of the light falling thereon. The differential amplifiers 153, 155, 157 and 159 are effective to indicate the difference between the output signals of corresponding photovoltaic elements and therefore the photovoltaic detecting devices in combination with the differential amplifiers function substantially the same as the photoresistive elements in the first and second detecting devices and the common terminals therebetween, of the circuit shown in FIG. 1.

Thus, there has been provided, in accordance with the present invention, a focus detecting apparatus including a unique balancing circuit included therein which is operative to compensate the signals provided by the photoresponsive element for any mismatch in effective sensitivity existing between those corresponding elements while, at the same time, being simple in design and operation and relatively inexpensive to manufacture.

The embodiments of the invention in which an exclusive property or privilege is claimed are defined as follows:

1. An apparatus comprising:
    means arranged to receive radiation from an object for defining a light path including first and second discretely identifiable portions of said radiation;
    first and second detecting devices positioned in said light path and arranged for sensing the intensity of said first and second discretely identifiable portions of said radiation to produce a difference signal at a common terminal representative of the difference therebetween;

circuit means connected to said common terminal;

means selectively operable between a first position in said light path, and a second position out of said light path, said selectively operable means, when in said first position, being effective to cause substantially equal amounts of radiation to fall on said first and second detecting devices, said circuit means including means for storing a balancing signal representative of the difference signal appearing at said common terminal when said selectively operable means is in said first position, said circuit means further including means for combining said stored balancing signal with said difference signal generated when said selectively operable means is in said second position to provide a compensated difference signal which is representative of the difference between said balancing signal and said difference signal, said compensated difference signal being compensated for any inequality in effective sensitivity between said first and second detecting devices.

2. The apparatus as set forth in claim 1 wherein said circuit means includes:

an amplifier means having first and second input terminals and an output terminal;

a capacitor means connected between said common terminal and said first input terminal of said amplifier means; and an impedance means connected between said first input terminal of said amplifier means and a common reference potential, said second input terminal of said amplifier means also being connected to said common reference potential, said amplifier means providing said compensated difference signal at said output terminal thereof.

3. The apparatus as set forth in claim 1 wherein said first and second detecting devices are photoresistors.

4. The apparatus as set forth in claim 1 wherein said first and second detecting devices each comprise a like plurality of photoresistors having first and second terminals, said first terminals of said photoresistors of said first detecting device being commonly connected to means for connection to a first voltage source, said first terminals of said photoresistors of said second detecting device being commonly connected to means for connection to a second voltage source, said second terminals of corresponding elements of said first and second detecting devices being connected together thereby forming a plurality of said common terminals, said apparatus including one of said circuit means connected to each of said plurality of said common terminals.

5. The apparatus as set forth in claim 4 wherein said apparatus includes a signal processing means which comprises:

means for rectifying said compensated difference signals; and means connected to said rectifying means for providing a composite signal representative of the sum of said rectified, compensated difference signals.

6. The apparatus as set forth in claim 1 wherein said first and second detecting devices are photovoltaic elements.

7. The apparatus as set forth in claim 1 wherein said first and second detecting devices each comprise a like plurality of photovoltaic elements having first and second terminals, said first terminals of said photovoltaic elements being connected to a common reference potential;

a plurality of differential amplifier circuits each having first and second input terminals and an output terminal, said second terminals of corresponding photovoltaic elements of said first and second detecting devices being connected elements said first and second input terminals, respectively, of different ones of said differential amplifier circuits, said output terminals of said differential amplifier circuits each being connected to a separate common terminal, said apparatus including one of said circuit means connected to each of said common terminals.

8. The apparatus as set forth in claim 7 wherein said apparatus includes a signal processing means comprising:

means for rectifying said compensated difference signals; and means connected to said rectifying means for providing a composite signal representative of the sum of said rectified compensated difference signals.

9. The apparatus as set forth in claim 1 wherein said defining means further includes first and second lens means for receiving spatially separated segments of radiation from the object, said first lens means defining said first discretely identifiable portion and said second lens means defining said second discretely identifiable portion.

10. A focus detecting apparatus for use with means for focussing a principal image of an object on a predetermined plane, the focus detecting apparatus comprising:

first and second means arranged to receive radiation from the object for defining a light path including first and second discretely identifiable portions of said radiation, said first and second portions being effective to form first and second auxiliary images of the object, respectively, said second auxiliary images being spatially separated from said first auxiliary image;

first and second detecting devices positioned to receive radiation from said first and second auxiliary images, respectively;

means operable conjointly with said means for focussing the principal image for introducing relative motion between at least one of said auxiliary images and the associated detecting device;

said first and second detecting devices each including a similar array of a plurality of light responsive elements, each element being arranged to provide an electrical signal representative of the intensity of the light impinging thereon;

means for comparing the electrical signal from each element of one of said arrays with the electrical signal from a corresponding element of the other of said arrays, and deriving from each such comparison a difference signal which appears at a separate common terminal;

signal processing means;

circuit means for receiving said difference signals, said circuit means being connected to said signal processing means;

means selectively operable between a first position in said light path and a second position out of said light path, said selectively operable means, when in said first position, being effective to cause substantially equal amounts of radiation to fall on said first and second detecting devices, said circuit means including means for storing balancing signals representative of each of the difference signals appearing when said selectively operable means is in said first position, said circuit means further including means for combining said balancing signals with the associated difference signals generated when said selectively operable means is in said second position, thereby providing for each such combination, a compensated difference signal which is compensated for any inequality in effective sensitivity between said first and second detecting devices, said signal processing means being operable to process the compensated difference signals to produce an output signal which is representative of the condition of focus of the principal image on the predetermined plane.

* * * * *